Dec. 28, 1948. P. A. CHAMBERS 2,457,348
COMBINED SIGNAL LIGHT AND REAR VIEW MIRROR
Filed March 7, 1946

INVENTOR
Paul A. Chambers
BY C. G. Stratton
ATTORNEY

Patented Dec. 28, 1948

2,457,348

UNITED STATES PATENT OFFICE 2,457,348

COMBINED SIGNAL LIGHT AND REARVIEW MIRROR

Paul A. Chambers, Santa Monica, Calif., assignor of one-half to Loyal E. Harris, Santa Monica, Calif.

Application March 7, 1946, Serial No. 652,769

9 Claims. (Cl. 177—329)

This invention relates to a combined signal light and rear view mirror. An object of the invention is to provide such a combination in which the lighting means does not interfere with the mirror even though contained in the same housing.

Another object is to provide signaling means whereby the driver of an automobile may signal to approaching cars as well as to cars in the rear and at the side, that the car carrying one or more of the present devices is going to turn.

Still another object of this invention is to provide such a signaling means that can be placed on opposite sides of an automobile in order to signal which way the car carrying same is going to turn.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely described one embodiment of the present invention, which is given by way of illustration for example only.

In the drawings, like reference characters designate similar parts in the several views.

Cross reference is hereby made to my co-pending application for design patent, Serial No. D. 127,192, filed March 7, 1946, which has now been issued into Design Patent No. D. 147,639, issued October 14, 1947, for subject matter shown but not claimed herein.

Figure 1:
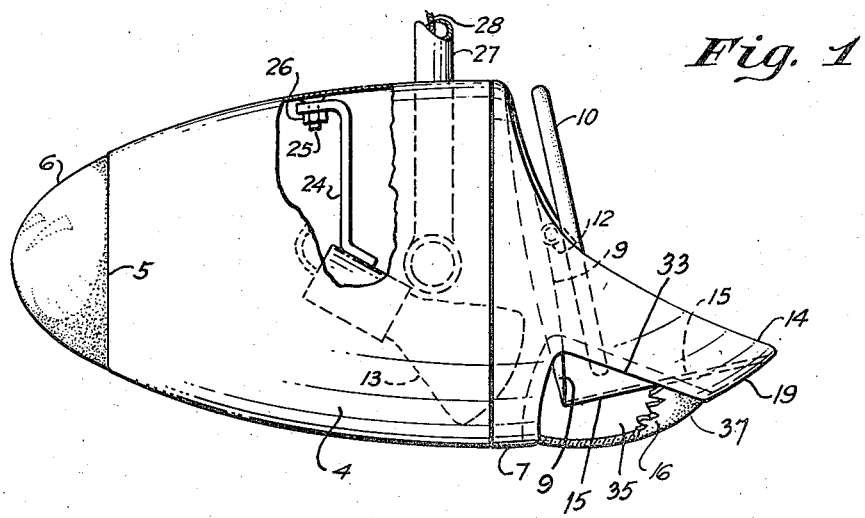
Fig. 1 is a top plan view of a combined device, embodying the foregoing objects.
Figure 2:
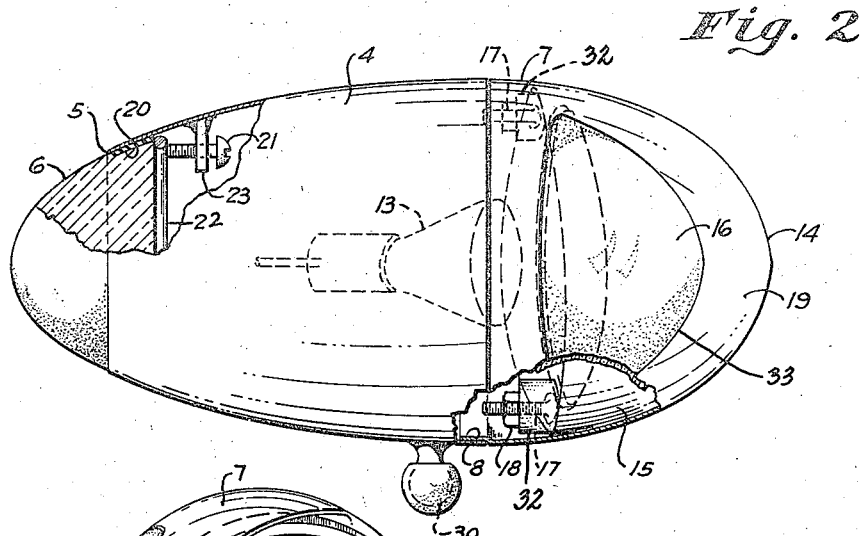
Fig. 2 is a side elevational view, taken from the bottom in Fig. 1, but shown partly broken away.

Referring more in detail to the drawings, the reference number 4 generally indicates the housing of the present device. The housing 4 is streamlined and has an open, tapering front end 5, in which is mounted a tapering, streamlined lens 6 that forms the nose of the device.

Telescoping with the principal part of the housing 4 is a rear end member 7. The telescoping overlap around the circumference of the housing 4 and the end member 7 is suggested at 8. These overlapping portions are arranged to afford a tight fit therebetween.

The end member 7 has an opaque end plate 9 upon which is pivotally mounted a rear view mirror 10. Said pivotal mounting is suggested as a ball and socket connection 12 in the drawings. The opaque end plate 9 protects the mirror from the glow of the light bulb 13 in the housing 4.

Figure 3:
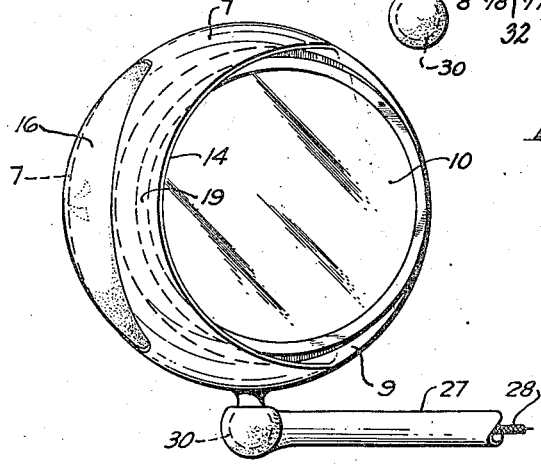
Fig. 3 is an end elevational view looking from the right in Fig. 2.

The end member 7 has an outwardly extending lip 14, the inner wall 15 of which is an opaque shield that further protects the mirror 10 from the light within the housing 4. An outwardly bulging lens 16 extends beyond the periphery of the end member 7, as perhaps best shown in Fig. 3. Moreover, the lens 16 tapers toward the tip of the lip, as suggested at 37 in Fig. 1, so that it can be seen from the rear as well as from the side and a slight amount from the front. The shield 15 is spaced from the lens 16 to provide a slot 35.

Bolts 17 are welded on the back of the end plate 9, projecting inwardly toward the body 4 of the housing. Nuts 18 and rubber washers 32 on the bolts 17 clamp the lens 16 in the opening 33 of the outer face 19 of the lip 14. The rubber washers press against the lens 16 to hold same in place, when pressure is put on them by means of the nuts 18.

It is believed clear to those skilled in the art, without further illustration, that suitable packing may be arranged between the lens 16 and the rim of the opening 33, on the inside thereof. A ring 22 is preferably clamped against the lens 6 by screw means 21 mounted in lugs 23 that are in turn welded to the inner face of the housing 4. Packing 20 is arranged between the lens 6 and the overlapping portion of the housing 4.

The electric light bulb 13 is supported inside the housing 4, by means of a bracket 24, which in turn is clamped in position by a nut 26 on a stud 25 that is welded to the inner face of the housing 4.

Means to support the entire assembly comprise an arm 27 that may be mounted on an automobile by any suitable means (not shown). The arm 27 is hollow, to carry wiring 28 for the electric light. The arm 27 has a ball and socket connection 30 with the assembly whereby the latter may be adjusted universally, as desired.

From the present arrangement, it will be noted that light from the bulb 13 shines in the slot 35 between the lens 16 and the shield 15. The lens 16 is thereby illuminated without the light shining on the mirror, even though the mirror is on the other side of the shield.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a device of the character described, a signal light housing a rear view mirror supported at one end of said housing, means for supporting an electric light within said housing, a lens disposed edgewise of and spaced from the mirror and arranged to receive illumination from said light, and opaque shielding means between the mirror and the light and spaced from the lens and mirror, said shielding means being disposed to prevent light reaching the lens from shining on the mirror.

2. In a device of the character described, a rear view mirror, a lens disposed at the side of and spaced from the mirror, a housing adjustably supporting the rear view mirror and providing a slot behind the lens, means for supporting an electric light to shine in the slot and thereby illuminate the lens, the housing having opaque shielding means between the mirror and the light and supporting the mirror and disposed to prevent light shining in the slot from shining on the mirror.

3. In a device of the character described, a housing having lenses arranged in different directions that are generally at right angles to each other, and a light-supporting socket arranged to support an electric light bulb in the housing to shine through both lenses, the housing having a pocket out of the path of light shining through either lens, a plate in said pocket and spaced from said lenses, and a rear view mirror pivotally mounted on said plate, said plate forming an opaque shield to prevent light of the bulb from shining on the mirror.

4. In a device of the character described, a housing having lateral opening therethrough, a lens in the opening, and a light-supporting socket arranged to support an electric light bulb in the housing to shine through the lens, the housing having a pocket out of the path of light shining through the lens, a rear view mirror and a shield in said pocket and supporting said rear view mirror.

5. In a device of the character described, a housing having a pocket opening outwardly and open at a side, said housing provided with an opaque shield and a plate, a lens in the outside wall of the housing arranged to transmit light in a direction other than toward the pocket a rear view mirror pivotally mounted on said plate, and a light-supporting socket in the housing arranged to hold a light bulb in position to shine upon the lens.

6. In a device of the character referred to, a housing, a lens at one end of the housing, the rear of the housing having a lateral opening, a lens in said opening, a plate at the opposite end of the housing, a rear view mirror pivotally mounted on said plate, a light bulb socket in said housing disposed to shine through both said lenses, the housing at the opposite end having an opaque wall cooperating with said plate to prevent light from the bulb shining upon the mirror.

7. In a device of the character referred to, a housing having a front lens and a rear lateral lens, said housing provided with a plate spaced from said lateral lens to form a pocket, a light bulb supported within the housing to shine through both lenses, and a rear view mirror mounted on said plate for movement independent of said housing, said plate shielding the mirror from the light of the bulb.

8. In a device of the character referred to, a housing having a lens at one end, another lens in the side wall of said housing, a light shield in said housing spaced from said lens, and a rear view mirror mounted on said light shield for universal movement relative thereto and to said housing.

9. In a device of the character referred to, a housing having a rear end member provided with a lateral opening and with means spaced from said opening to form a pocket, a lens in said opening, a rear view mirror, a plate in said housing supporting said mirror for universal movement and cooperating with said spaced means to shield said mirror from light projected into said pocket, and a light source carried by said housing for directing light into said pocket and through said lens.

PAUL A. CHAMBERS.

REFERENCES CITED

The following references are of record in the file of this patent:

UNITED STATES PATENTS

| Number | Name | Date |
|---|---|---|
| 1,368,644 | Mochizuki | Feb. 15, 1921 |
| 1,602,094 | Badding | Oct. 5, 1926 |
| 2,180,610 | Ritz-Woller | Nov. 21, 1939 |
| 2,295,176 | Kelly | Sept. 8, 1942 |